United States Patent
Hamilla

(10) Patent No.: US 7,561,884 B2
(45) Date of Patent: Jul. 14, 2009

(54) SYSTEM AND METHOD FOR AUTOMATED TRACKING OF ASSETS USING LOCATION MEASUREMENTS AND AD-HOC ROUTING ALGORITHMS

(75) Inventor: Joseph M. Hamilla, Stanford, FL (US)

(73) Assignee: MeshNetworks, Inc., Maitland, FL (US)

( * ) Notice: Subject to any disclaimer, the term of this patent is extended or adjusted under 35 U.S.C. 154(b) by 435 days.

(21) Appl. No.: 11/241,349

(22) Filed: Sep. 30, 2005

(65) Prior Publication Data

US 2007/0077943 A1  Apr. 5, 2007

(51) Int. Cl.
*H04M 7/00* (2006.01)
(52) U.S. Cl. .................. 455/456.1; 455/402.2; 455/566
(58) Field of Classification Search .............. 455/404.2, 455/456.1, 456.2, 456.3, 456.4, 456.5, 456.6, 455/457, 521, 422.1, 421, 556.1, 556.2, 557, 455/566; 348/14.01, 211.2, 211.3; 340/572.1, 340/539.13, 573.4, 5.2
See application file for complete search history.

(56) References Cited

U.S. PATENT DOCUMENTS 6,980,524 B1 * 12/2005 Lu et al. ..................... 370/254
2001/0022558 A1 * 9/2001 Karr et al. ................... 342/450
2003/0054838 A1 * 3/2003 Carrez ......................... 455/456
2004/0082341 A1 * 4/2004 Stanforth ................. 455/456.1
2004/0183672 A1  9/2004 Krishen et al.
2004/0189816 A1 * 9/2004 Nakazawa et al. ....... 348/211.2
2005/0128083 A1  6/2005 Puzio et al.
2005/0206726 A1  9/2005 Yoshida et al.

* cited by examiner

*Primary Examiner*—Jean A Gelin
(74) *Attorney, Agent, or Firm*—Randi L. Karpinia

(57) ABSTRACT

A system and method for automated visual tracking of assets (302), such as personnel or vehicles, using location measurements and ad-hoc routing algorithms employed in a wireless multihopping communication network (100). The system and method comprise a plurality of imaging devices (300) that are deployed about an area and provide image information to at least one workstation (304) that displays the images based on the image information. In particular, as an asset (302) moves, the workstation (304) switches from displaying an image of the asset (302) captured by an imaging device (300) away from which the asset (302) is moving to displaying an image of the asset (302) captured by an imaging device (300) toward which the asset (302) is moving.

22 Claims, 4 Drawing Sheets

US 7,561,884 B2

SYSTEM AND METHOD FOR AUTOMATED TRACKING OF ASSETS USING LOCATION MEASUREMENTS AND AD-HOC ROUTING ALGORITHMS

FIELD OF THE INVENTION

The present invention relates in general to wireless mobile ad-hoc multihopping peer-to-peer communication networks, and more particularly, to a system and method for automated tracking of assets using location measurements and ad-hoc routing algorithms.

BACKGROUND

As understood in the art, systems exist that are capable of capturing images of objects, such as humans, vehicles, and so on, in motion. Typically, these systems comprises a plurality of cameras deployed at various locations in an area of interest, and at least one monitoring station for viewing the images captured by the cameras.

An example of an image system is described in a publication by Shin'ichi Nakagawa et al. entitled "Image Systems Using RFID Tag Positioning Information", NTT Technical Review, Vol. 1, No. 7, October 2003. In this type of system, radio frequency identification (RFID) tags are attached to the object of interested (e.g., to the nametag of a kindergarten child). Several cameras are deployed in the kindergarten, and the system can monitor the child's movements based on the RFID tags and switch the camera images based on this movement.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
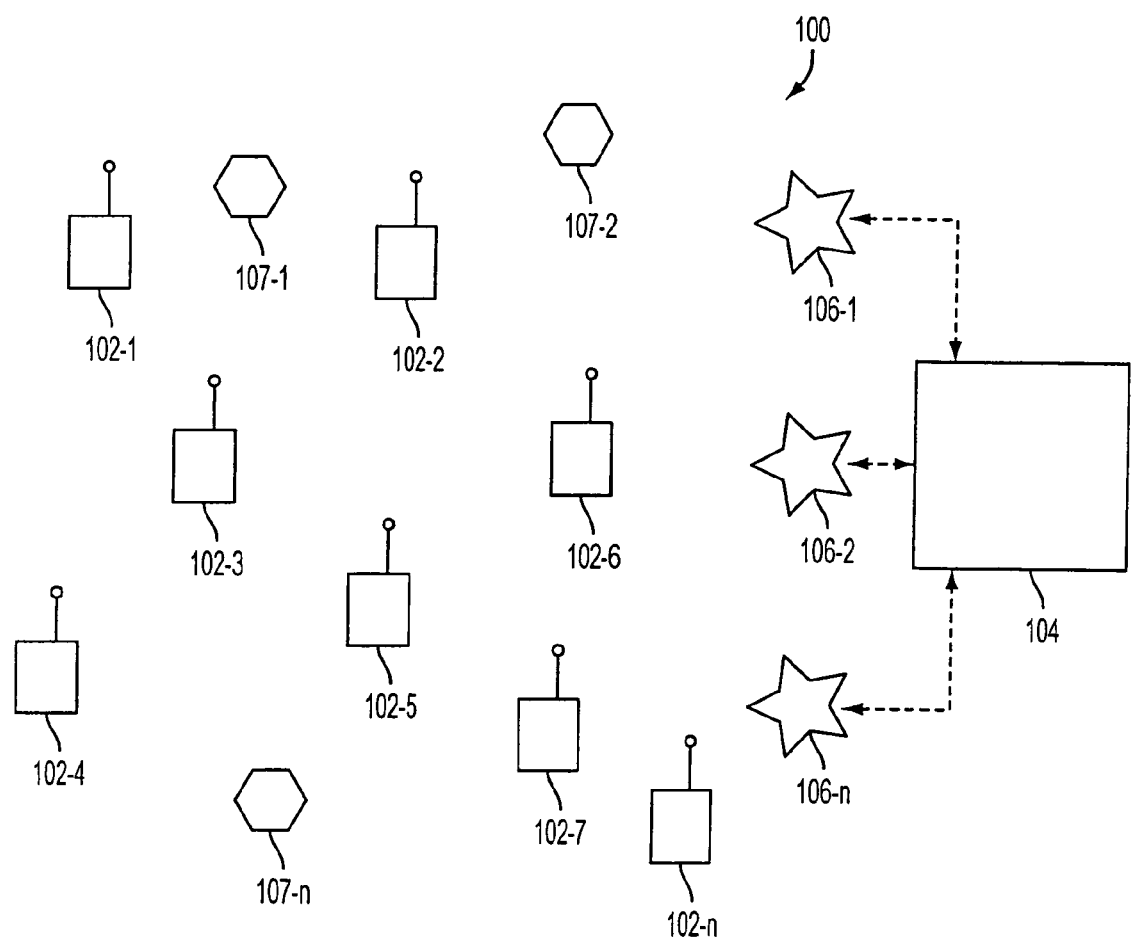
FIG. 1 is a block diagram of an example ad-hoc wireless communications network including a plurality of nodes employing a system and method in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a system and method for automated tracking of assets using wireless multihopping ad-hoc network technology. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of a system and method for automated tracking of assets using wireless multihopping ad-hoc network technology as described herein. The non-processor circuits may include, but are not limited to, a radio receiver, a radio transmitter, signal drivers, clock circuits, power source circuits, and user input devices. As such, these functions may be interpreted as steps of a method for automated tracking of assets using wireless multihopping ad-hoc network technology. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

As discussed in more detail below, the present invention provides a system and method for automated tracking of assets, such as personnel or vehicles, using location measurements and ad-hoc routing algorithms employed in a wireless mobile ad-hoc peer-to-peer communication network. As can be appreciated by one skilled in the art, the nature of a mobile ad-hoc network makes it very suitable for tracking assets such as personnel or vehicles, and this tracking ability can be used with a imaging device and monitoring system.

In recent years, a type of mobile communications network known as an "ad-hoc" network has been developed. In this type of network, each mobile node is capable of operating as a base station or router for the other mobile nodes, thus eliminating the need for a fixed infrastructure of base stations. As can be appreciated by one skilled in the art, network nodes transmit and receive data packet communications in a multiplexed format, such as time-division multiple access (TDMA) format, code-division multiple access (CDMA) format, or frequency-division multiple access (FDMA) format.

More sophisticated ad-hoc networks are also being developed which, in addition to enabling mobile nodes to communicate with each other as in a conventional ad-hoc network, further enable the mobile nodes to access a fixed network and thus communicate with other mobile nodes, such as those on the public switched telephone network (PSTN), and on other networks such as the Internet. Details of these advanced types of ad-hoc networks are described in U.S. Pat. No. 7,072,650entitled "Ad Hoc Peer-to-Peer Mobile Radio Access System Interfaced to the PSTN and Cellular Networks", issued on Jul. 4, 2006, in U.S. Pat. No. 6,807,165 entitled "Time Division Protocol for an Ad-Hoc, Peer-to-Peer Radio Network Having Coordinating Channel Access to Shared Parallel Data Channels with Separate Reservation Channel", issued on Oct. 19 2004, and in U.S. Pat. No. 6,873,839 entitled "Prioritized-Routing for an Ad-Hoc, Peer-to-Peer, Mobile Radio Access System", issued on Mar. 29, 2005, the entire content of each being incorporated herein by reference.

FIG. 1 is a block diagram illustrating an example of an ad-hoc packet-switched wireless communications network 100 employing an embodiment of the present invention. Specifically, the network 100 includes a plurality of mobile wireless user terminals 102-1 through 102-n (referred to generally as nodes 102 or mobile nodes 102), and can, but is not required to, include a fixed network 104 having a plurality of access points 106-1, 106-2, . . . 106-n (referred to generally as nodes 106, access points 106 or intelligent access points (IAPs) 106), for providing nodes 102 with access to the fixed network 104. The fixed network 104 can include, for example, a core local access network (LAN), and a plurality of servers and gateway routers to provide network nodes with access to other networks, such as other ad-hoc networks, the public switched telephone network (PSTN) and the Internet. The network 100 further can include a plurality of fixed routers 107-1 through 107-n (referred to generally as nodes 107 or fixed routers 107) for routing data packets between other nodes 102, 106 or 107. It is noted that for purposes of this discussion, the nodes discussed above can be collectively referred to as "nodes 102, 106 and 107", or simply "nodes". As can be appreciated by one skilled in the art, the nodes 102, 106 and 107 are capable of communicating with each other directly, or via one or more other nodes 102, 106 or 107 operating as a router or routers for packets being sent between nodes, as described in U.S. Pat. Nos. 7,072,650 6,807,165, and 6,873,839.

Figure 2:
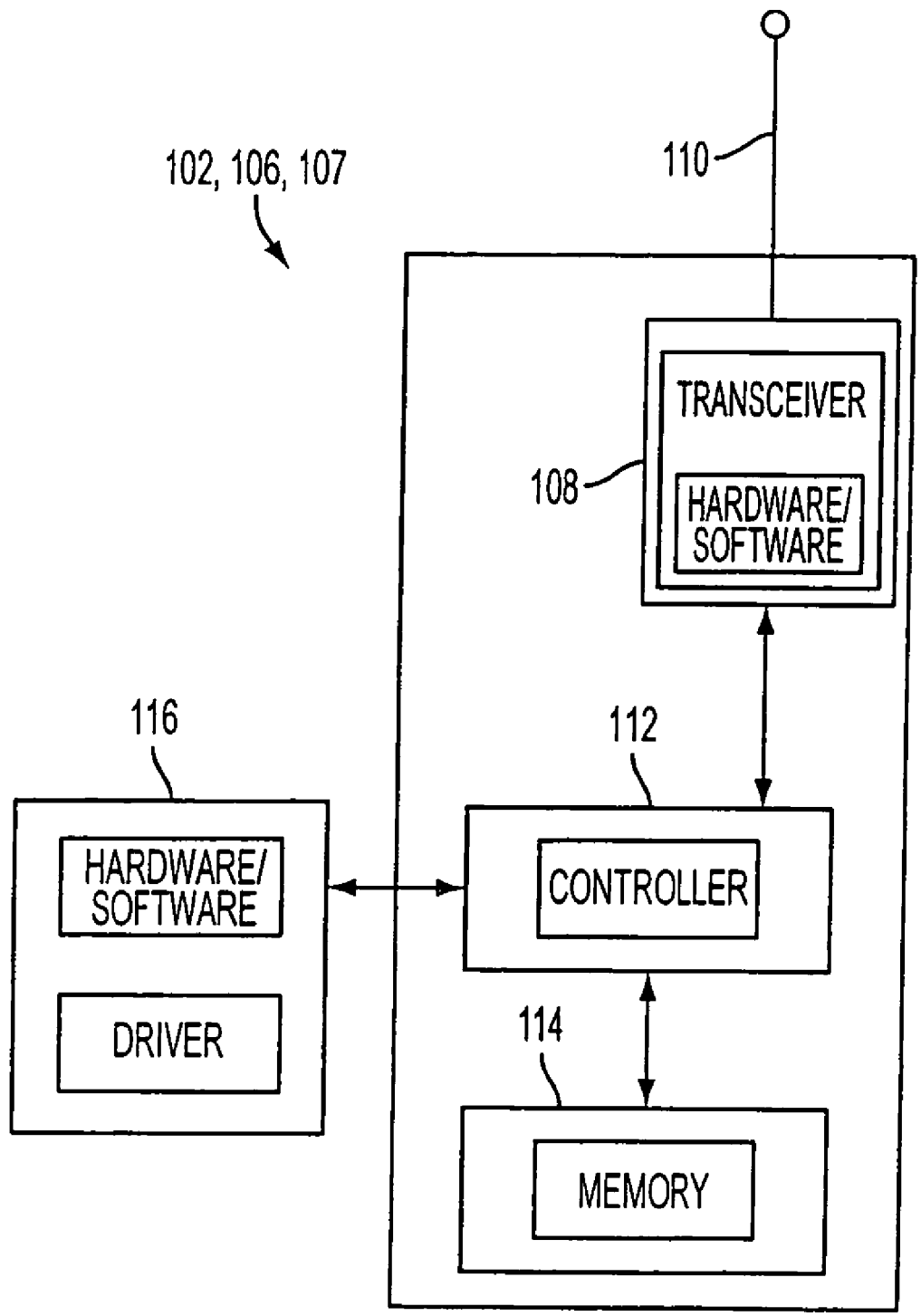
FIG. 2 is a block diagram illustrating an example of a mobile node employed in the network shown in FIG. 1.

As shown in FIG. 2, each node 102, 106 and 107 includes a transceiver, or modem 108, which is coupled to an antenna 110 and is capable of receiving and transmitting signals, such as packetized signals, to and from the node 102, 106 or 107, under the control of a controller 112. The packetized data signals can include, for example, voice, data or multimedia information, and packetized control signals, including node update information.

Each node 102, 106 and 107 further includes a memory 114, such as a random access memory (RAM) that is capable of storing, among other things, routing information pertaining to itself and other nodes in the network 100. As further shown in FIG. 2, certain nodes, especially mobile nodes 102, can include a host 116 which may consist of any number of devices, such as a notebook computer terminal, mobile telephone unit, mobile data unit, or any other suitable device. Each node 102, 106 and 107 also includes the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included.

Figure 3:
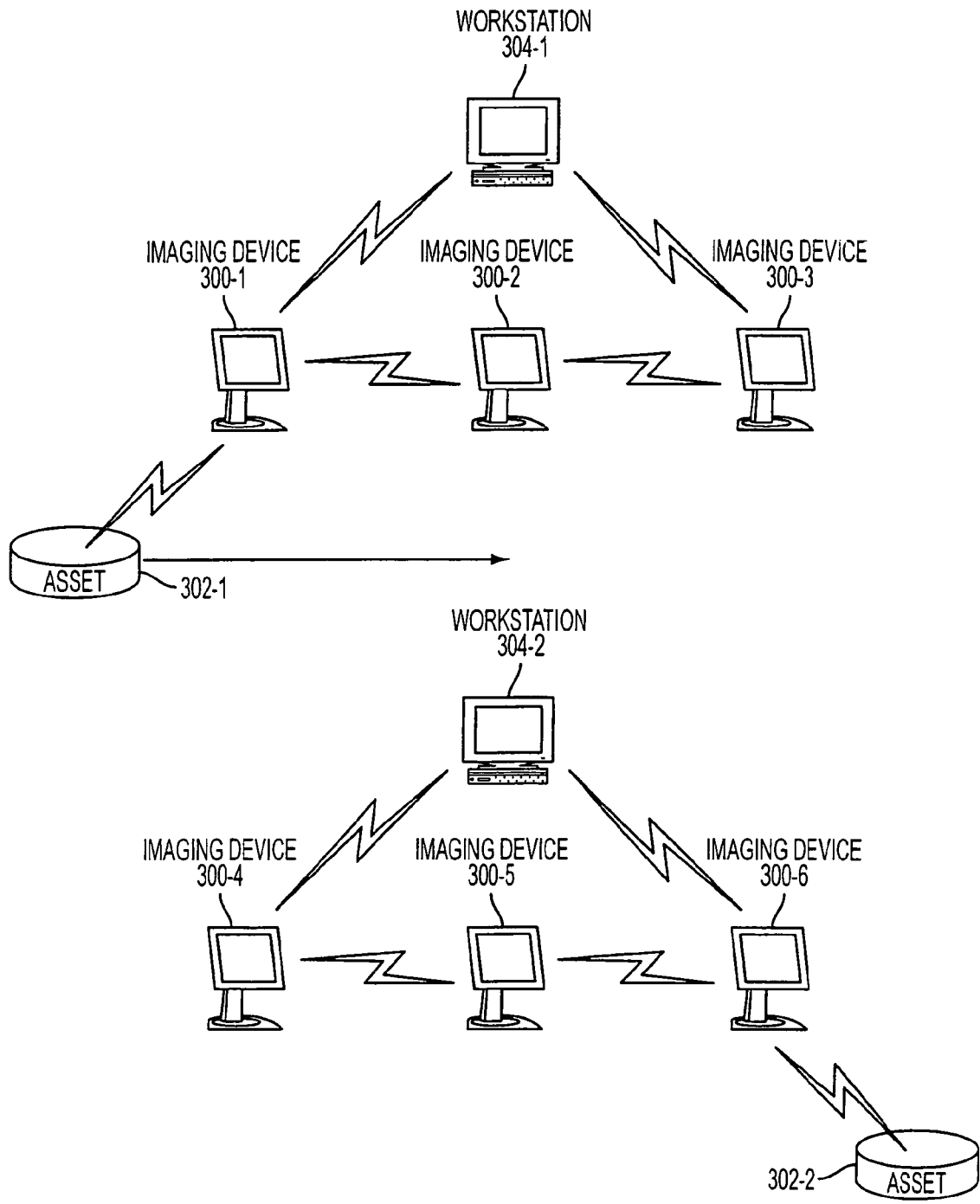
FIG. 3 is a conceptual block diagram illustrating an example of the locations of imaging devices and workstations with respect to a moving node of the network shown in FIG. 1.

As further shown in FIG. 3, the network 100 can be implemented to track assets 302-1 and 302-2, such as personnel, vehicles, laptop computers, communication devices, and so on moving within the wireless ad-hoc network 100 using geo-location ranging measurements and ad-hoc multihopping routing algorithm metrics to automatically control imaging devices 300-1 through 300-6, which can be cameras, images sensors, or other type of sensors or visual monitoring devices, such as infrared sensors, charge coupled device (CCD) sensors, and so on. This configuration can therefore be encompassed in a network management and location display system, such as a security monitoring system. The assets 302-1 and 302-2 can include a mobile node 102 as described above, and the imaging devices 300-1 through 300-6 can include or be associated with a wireless router 107, for example, or an IAP 106, as discussed above. Hence, the algorithms for processing the metrics and controlling the imaging devices 300-1 through 300-6 can reside in the software application which runs external to the imaging devices 300-1 through 300-6 and asset 302-1 and 302-2, such as on their associated nodes. The tracking data provided by the software application is non-intrusive to the other data transmitted within the network 100 to limit impact on bandwidth capacity in the network 100. That is, the tracking data can be transmitted during periods when other types of communication data is not being transmitted between nodes 102, 106 and 107 in the network 100, or when only a small amount of other types of data is being transmitted.

As can be appreciated by one skilled in the art, the geo-location measurement information is generated from ranging measurements within the asset's communication device, that is, a mobile node 102, communicating in the wireless network 100, and the ranging measurements can be exchanged in ranging information between the nodes 102, 106 and 107. Examples of these location measurements can be found in U.S. Pat. No. 6,728,545 and in published U.S. patent application Ser. Nos. 20030227895 and 20040005902, all of which are incorporated by reference herein. The asset position is calculated locally using fixed references, such as the imaging devices 300-1 though 300-6, and any other stationary nodes, such as nodes 106 and 107, and sent to a mapping application for display. The mapping application can be running on a workstation 304-1 or 304-2, which employs or is associated with a node of the network 100, such as node 102, 106 and 107, and thus can communicate with the other nodes 102, 106 and 107, imaging devices 300-1 through 300-6 and assets 302-1 and 302-2 operating in the network 100.

Figure 4:
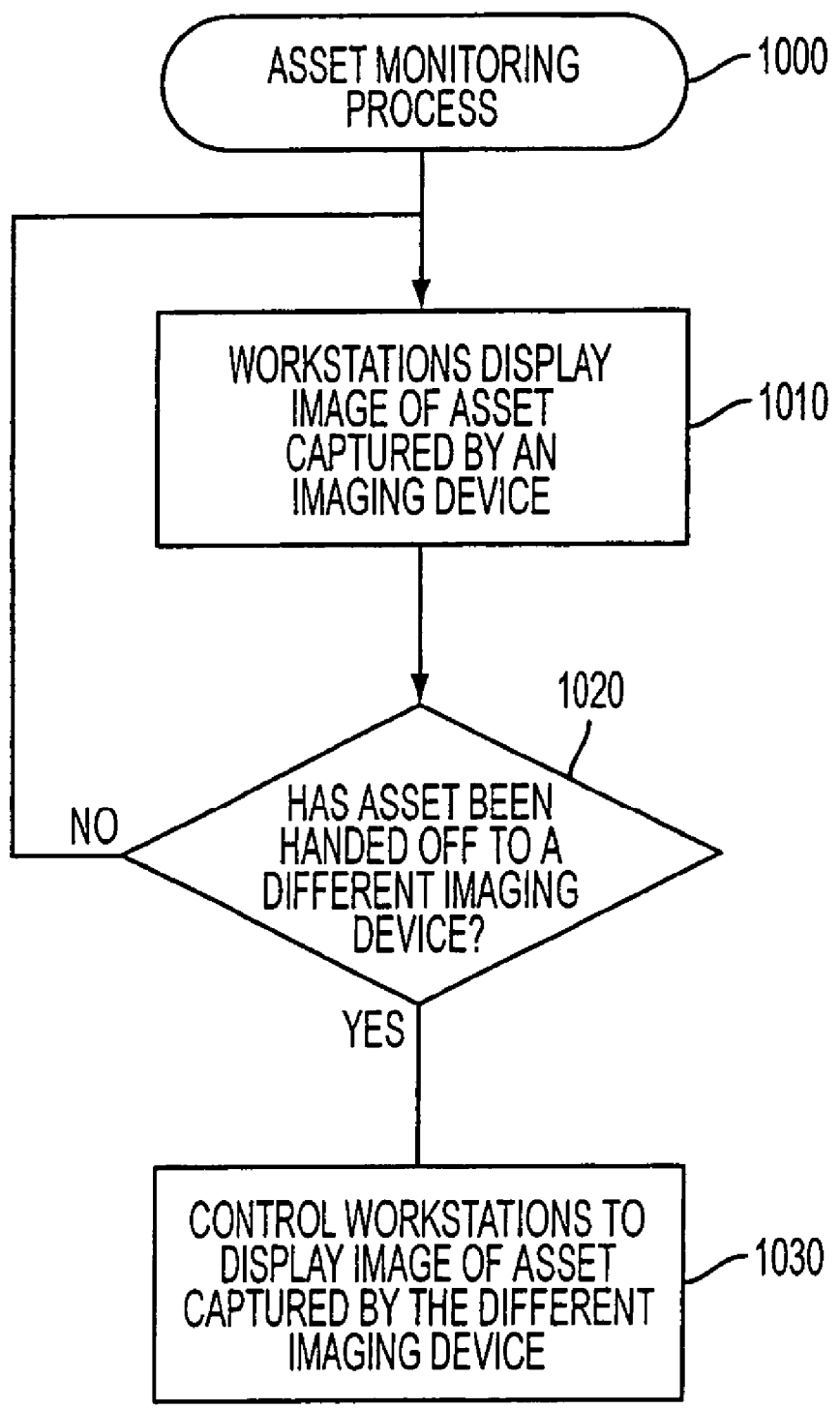
FIG. 4 is a flowchart illustrating an example of operations performed by the system shown in FIG. 3 in accordance with an embodiment of the present invention.

As can further be appreciated by one skilled in the art, ad-hoc routing algorithms used by the network 100 contain data for route switching. Using this data, an asset 302-1 through 302-2 can be handed off from infrastructure component to infrastructure component which, in this arrangement, is an imaging device 300-1 through 300-6. Based on this hand off information, the application running on the workstations 304-1 and 304-2 can automatically switch to display the signals provided from the imaging device that the asset is moving towards without operator action. For example, as shown in the example of the asset monitoring process beginning at step 1000 in the flowchart of FIG. 4, the workstations 304-1 and 304-2 in step 1010 can display a view captured by an imaging device 300-1 if an asset 302-1 is with the imaging range (e.g., proximate to) the imaging device 300-1. If the process determines in step 1020 that the asset 302-1 has not moved too far away from the imaging device 300-1, the workstations 304-1 and 304-2 will continue to display the view captured by imaging device 300-1.

However, if the processing determines in step 1020 that the asset 302-1 is moving in a direction from imaging device 300-1 toward imaging device 300-2, as the tracking data indicates that the asset 302-1 is approaching imaging device 300-2, the applications running on workstation 304-1 and 304-2 can control the workstations 304-1 and 304-2 in step 1030 to automatically stop displaying the view captured by imaging device 300-1 and start displaying the view captured by imaging device 300-2 when the asset 302-1 is within a desired distance (e.g., several feet or yards, or any other suitable distance) from the imaging device 300-2. Any alternative display arrangement can be used, such as a split screen display, or the workstations 304-1 and 304-2 can include a control button that allows a user to switch between views captured by the different imaging devices 300-1 and 300-2, as well as the other imaging devices 300-3 through 300-6, as can be appreciated by one skilled in the art.

In addition, the geo-location measurement data can be combined with the tracking data and used to adjust the orientation of the imaging devices 300-1 through 300-6, that is, to control the pan, tilt, and zoom features of the imaging devices 300-1 through 300-6 as can be appreciated by one skilled in the art, based on the location and range measured by the nodes 107 (or 106) associated with the imaging devices 300-1 through 300-6 which act as a fixed reference. For example, when the x,y,z reference coordinates of an asset (e.g., asset 302-1) are provided to an imaging device (e.g., imaging device 300-2), the imaging device 300-2 can use the calculated x,y,z reference coordinates of the asset 302-1 to automatically control the pan and tilt to locate the asset 302-1. The zoom control on the imaging device 300-2 can be controlled based on measured range from the imaging device 300-2 to the asset 302-1. For example, for purposes of calculation, if the fixed location of the imaging device 300-2 are given x,y,z coordinates 0,0,0, and an asset 302-1 is determined to have the relative coordinates of 1,2,3, the control application operating within the imaging device 300-2 can steer the imaging device 300-2 to the asset coordinates by adjusting the pan (e.g., the x coordinate) from zero (0) to one (1), the tilt (e.g., the y coordinate), from zero (0) to two (2), and zoom (e.g., the z coordinate) from zero (0) to three (3), where the coordinate values relate to distance or gradient.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for tracking at least one asset using a multihopping communication network comprising a plurality of nodes, the method comprising:

assigning at least one mobile node in the network to at least one asset;

assigning at least one stationary node in the network to at least one visual monitoring device;

tracking movement of the mobile node assigned to the asset in the network, wherein the tracking comprises:

measuring one or more location data and one or more ranging data of the at least one asset by one or more nodes operating in the multihopping communication network, and tracking movement of the mobile node based on the measured one or more location data and one or more ranging data; and operating the visual monitoring device to capture image data of the asset based at least in part on the measured one or more location data and one or more ranging data.

2. A method as claimed in claim 1, further comprising:

operating the stationary node assigned to the visual monitoring device to send the image data to a monitoring station for display.

3. A method as claimed in claim 2, further comprising:

operating the monitoring station to display an image of the asset based at least in part on the image data.

4. A method as claimed in claim 3, further comprising:

operating the stationary node assigned to the visual monitoring device to send to the monitoring station location information indicating a location of the asset; and wherein the monitoring station operating step comprises operating the monitoring station to display the image of the asset based at least in part on the image data and the location information.

5. A method as claimed in claim 4, wherein:

the monitoring station operating step comprises operating the monitoring station to display the image of the asset when the location information indicates that the asset is within a desired distance of the stationary node.

6. A method as claimed in claim 1, further comprising adjusting an orientation of the visual monitoring device based at least in part on the measured one or more location data or one or more ranging data.

7. A method as claimed in claim 1, wherein:

the mobile node assigning step assigns each of a plurality of respective mobile nodes to a respective asset;

the stationary node assigning step assigns each of a plurality of stationary nodes to a respective visual monitoring device;

the tracking step tracks movement of the mobile nodes assigned to the assets in the network based at least in part on information exchanged between the mobile nodes and the stationary nodes; and the operating step comprises operating the visual monitoring devices to capture respective image data of the respective assets based at least in part on the exchanged information.

8. A method as claimed in claim 7, further comprising:

operating each of the stationary nodes assigned to the visual monitoring devices to send their respective image data to a monitoring station for display.

9. A method as claimed in claim 8, further comprising:

operating the stationary nodes assigned to the visual monitoring devices to send to the monitoring station respective location information indicating respective locations of the respective assets; and wherein the monitoring station operating step comprises operating the monitoring station to display the respective images of the respective assets based at least in part on the respective image data and the respective location information.

10. A system for tracking at least one asset using a multi-hopping communication network comprising a plurality of nodes, the system comprising:
  at least one mobile node to communicate in the network and assigned to at least one asset; and
  at least one stationary node to communicate in the network and assigned to at least one visual monitoring device, wherein the stationary node tracks movement of the mobile node assigned to the asset in the network based at least in part on one or more location data and one or more ranging data measured at one or more nodes operating in the multihopping communication network, and sends the one or more location data and one or more ranging data to the visual monitoring device based at least in part on which the visual monitoring device captures image data of the asset.

11. A system as claimed in claim 10, further comprising:
  a monitoring station; and
  wherein the stationary node assigned to the visual monitoring device sends the image data to the monitoring station.

12. A system as claimed in claim 11, wherein:
  the monitoring station displays an image of the asset based at least in part on the image data.

13. A system as claimed in claim 12, wherein:
  the stationary node assigned to the visual monitoring device sends to the monitoring station location information indicating a location of the asset; and
  wherein the monitoring station displays the image of the asset based at least in part on the image data and the location information.

14. A system as claimed in claim 13, wherein:
  the monitoring station displays the image of the asset when the location information indicates that the asset is within a desired distance of the stationary node.

15. A system as claimed in claim 10, wherein
  the stationary node assigned to the asset provides the one or more location data and one or more ranging data to the visual monitoring device such that the visual monitoring device adjusts its orientation based on the one or more location data and one or more ranging data.

16. A system as claimed in claim 10, further comprising:
  a plurality of mobile nodes, each assigned to a respective asset; and
  a plurality of stationary nodes, each assigned to a respective visual monitoring device to track movement of the mobile nodes assigned to the assets based on information exchanged between itself and the mobile nodes and to send the exchanged information to its visual monitoring device based at least in part on which the visual monitoring device captures image data of the assets being tracked.

17. A system as claimed in claim 16, further comprising:
  a monitoring station; and
  wherein the stationary nodes assigned to the visual monitoring devices send their respective image data to the monitoring station.

18. A system as claimed in claim 17, wherein:
  the stationary nodes assigned to the visual monitoring devices further send to the monitoring station respective location information indicating respective locations of the respective assets; and
  wherein the monitoring station displays the respective images of the respective assets based at least in part on the respective image data and the respective location information.

19. A method for tracking a visual image of at least one asset in a mobile ad hoc communication network, the method comprising:
  displaying a first view captured by a first imaging device of the at least one asset at a monitoring station when the at least one asset is within imaging range of the first imaging device;
  detecting at the monitoring station that the at least one asset is moving from the imaging range of the first imaging device to an imaging range of a second imaging device wherein the detecting comprises
    measuring one or more location data and one or more ranging data of the at least one asset by one or more nodes operating within the mobile ad hoc communication network, and
    detecting at the monitoring station that the at least one asset is moving from the imaging range of the first imaging device to an imaging range of a second imaging device based on the measured one or more location data and one or more ranging data; and
  displaying at the monitoring station a second view captured by the second imaging device of the at least one asset.

20. The method of claim 19, further comprising:
  continuing to display the first view captured by the first imaging device along with the second view captured by the second imaging device at the monitoring display.

21. The method of claim 19, farther comprising prior to the displaying the first view step:
  measuring one or more location data and one or more ranging data of the at least one asset by one or more nodes operating within the mobile ad hoc communication network; and
  adjusting an orientation of the first imaging device using the measured one or more location data and one or more ranging data of the at least one asset.

22. The method of claim 19, further comprising prior to the displaying the second view step:
  measuring one or more location data and one or more ranging data of the at least one asset by one or more nodes operating within the mobile ad hoc communication network; and
  adjusting an orientation of the second imaging device using the measured one or more location data and one or more ranging data of the at least one asset.

* * * * *